US012620208B2

(12) United States Patent
Gan et al.

(10) Patent No.: US 12,620,208 B2
(45) Date of Patent: May 5, 2026

(54) FACIAL BEAUTY PREDICTION METHOD, APPARATUS, DEVICE AND STORAGE MEDIUM

(71) Applicant: WUYI UNIVERSITY, Jiangmen (CN)

(72) Inventors: Junying Gan, Jiangmen (CN); Jianqiang Liu, Jiangmen (CN); Huicong Li, Jiangmen (CN); Junling Xiong, Jiangmen (CN); Xiaoshan Xie, Jiangmen (CN); Heng Luo, Jiangmen (CN)

(73) Assignee: WUYI UNIVERSITY, Jiangmen (CN)

( * ) Notice: Subject to any disclaimer, the term of this patent is extended or adjusted under 35 U.S.C. 154(b) by 261 days.

(21) Appl. No.: 18/702,055

(22) PCT Filed: May 22, 2023

(86) PCT No.: PCT/CN2023/095555
§ 371 (c)(1),
(2) Date: Apr. 17, 2024

(87) PCT Pub. No.: WO2024/229889
PCT Pub. Date: Nov. 14, 2024

(65) Prior Publication Data
US 2025/0239058 A1 Jul. 24, 2025

(30) Foreign Application Priority Data

May 10, 2023 (CN) .......................... 202310525485.5

(51) Int. Cl.
*G06K 9/00* (2022.01)
*G06V 10/764* (2022.01)
(Continued)

(52) U.S. Cl.
CPC ........ *G06V 10/7747* (2022.01); *G06V 10/764* (2022.01); *G06V 20/70* (2022.01); *G06V 40/172* (2022.01)

(58) Field of Classification Search
CPC .. G06V 10/7747; G06V 10/764; G06V 20/70; G06V 40/172; G06V 10/774; G06V 10/82; G06V 40/171; G06V 40/161
See application file for complete search history.

(56) References Cited

U.S. PATENT DOCUMENTS

| | | | |
|---|---|---|---|
| 11,521,011 B2 * | 12/2022 | Shcherbinin | ......... G06V 10/764 |
| 11,666,486 B2 * | 6/2023 | Lobner | ................. H04L 67/141 |
| | | | 250/214 AL |

(Continued)

FOREIGN PATENT DOCUMENTS

| | | | | |
|---|---|---|---|---|
| CN | 114445885 A | * | 5/2022 | ......... G06F 18/2415 |
| CN | 114463810 A | * | 5/2022 | ........... G06F 18/214 |

(Continued)

OTHER PUBLICATIONS

Self-correcting noise labels for facial beauty prediction, Gan Junying et al., Journal of image and graphic, 2022, pp. 1-11 (Year: 2022).*

(Continued)

*Primary Examiner* — Jayesh A Patel
(74) *Attorney, Agent, or Firm* — Vivacqua Crane, PLLC

(57) ABSTRACT

Embodiments of the disclosure discloses method and apparatus for facial beauty prediction, device and storage medium. The method includes the steps of classifying a training set into a plurality of first images with noise labels and a plurality of second images with non-noise labels; performing a re-weighting processing on the plurality of the second images; training a first model by using a target training set to obtain a second model; labeling image data by using the second model to obtain first data with labels and (Continued)

classify a training set of facial beauty prediction images to obtain a plurality of first images with noise labels and a plurality of second images with non-noise labels — S100 perform re-weighting processing on the second images — S200 form a target training set by the plurality of the first images and the plurality of the re-weighted second images, and train a first model by using the target training set to obtain a second model — S300 perform a labeling processing on image data by using the second model to obtain first data with labels and second data without labels — S400 train the second data through a classifier to generate third data with pseudo labels — S500 train the classifier according to the first data, the second data and the third data to obtain a target classifier — S600 perform facial beauty prediction on an image to be predicted through a facial beauty prediction model with the target classifier to obtain a facial beauty prediction result — S700 second data without labels; generating third data with pseudo labels through a classifier by using the second data; training the classifier according to the first data, the second data and the third data; processing an image to be predicted through a model with a target classifier to obtain a facial beauty prediction result.

20 Claims, 2 Drawing Sheets

(51) Int. Cl.
    *G06V 10/774*        (2022.01)
    *G06V 20/70*          (2022.01)
    *G06V 40/16*          (2022.01)

(56)               References Cited

U.S. PATENT DOCUMENTS

| | | | | |
|---|---|---|---|---|
| 2022/0067940 A1 * | 3/2022 | Heng | .................... | G06N 3/0464 |
| 2022/0101112 A1 * | 3/2022 | Brown | ................. | G06N 3/0895 |
| 2022/0309768 A1 * | 9/2022 | Gan | ..................... | G06V 40/172 |

FOREIGN PATENT DOCUMENTS

| | | | | | |
|---|---|---|---|---|---|
| CN | | 114611607 A | * | 6/2022 | ............. G06F 18/24 |
| WO | WO-2021052159 A1 | | * | 3/2021 | ........... G06V 40/161 |
| WO | WO-2021258482 A1 | | * | 12/2021 | ............. G06N 3/047 |

OTHER PUBLICATIONS

Benchmark of a Large Scale Database for Facial Beauty Prediction, Yikui Zhai et al., ACM, 2016, pp. 1-6 (Year: 2016).*
Deep self-taught learning for facial beauty prediction, Junying Gan et al., Elsevier, 2014, pp. 295-303 (Year: 2014).*
Detection of Atrial Fibrillation Episodes from Short Single Lead Recordings by Means of Ensemble Learning, Pietro Bonizzi et al., 2017, pp. 1-4 (Year: 2017).*
Gan, J., et al. "Self-correcting noise labels for facial beauty prediction," Journal of Image and Graphics, vol. 27, No. 8, 2022.
International Searching Authority. International Search Report and Written Opinion for PCT Application No. PCT/CN2023/09555 and English translation, mailed Dec. 5, 2023, pp. 1-9.

* cited by examiner

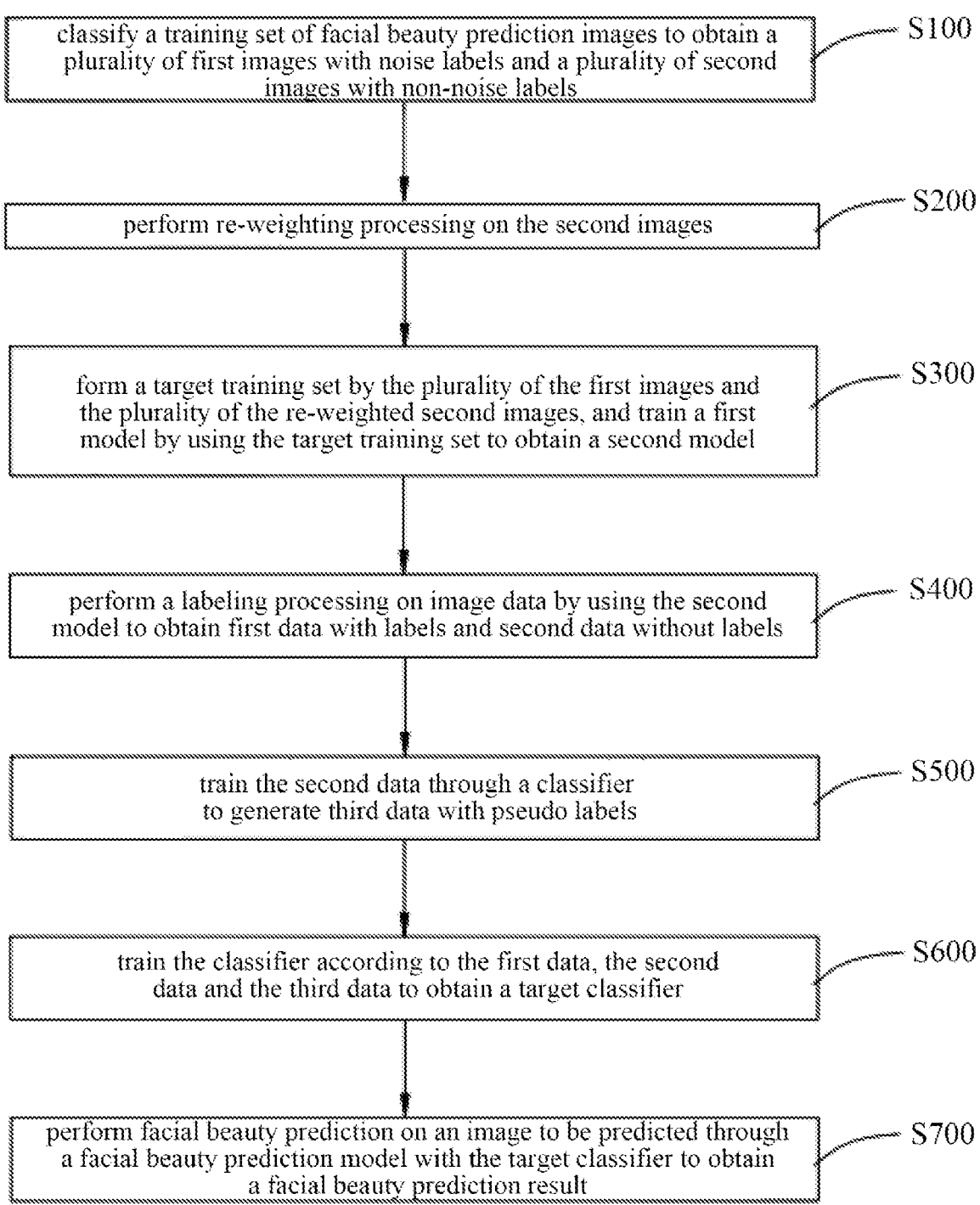

classify a training set of facial beauty prediction images to obtain a plurality of first images with noise labels and a plurality of second images with non-noise labels — S100 perform re-weighting processing on the second images — S200 form a target training set by the plurality of the first images and the plurality of the re-weighted second images, and train a first model by using the target training set to obtain a second model — S300 perform a labeling processing on image data by using the second model to obtain first data with labels and second data without labels — S400 train the second data through a classifier to generate third data with pseudo labels — S500 train the classifier according to the first data, the second data and the third data to obtain a target classifier — S600 perform facial beauty prediction on an image to be predicted through a facial beauty prediction model with the target classifier to obtain a facial beauty prediction result — S700

FIG. 1

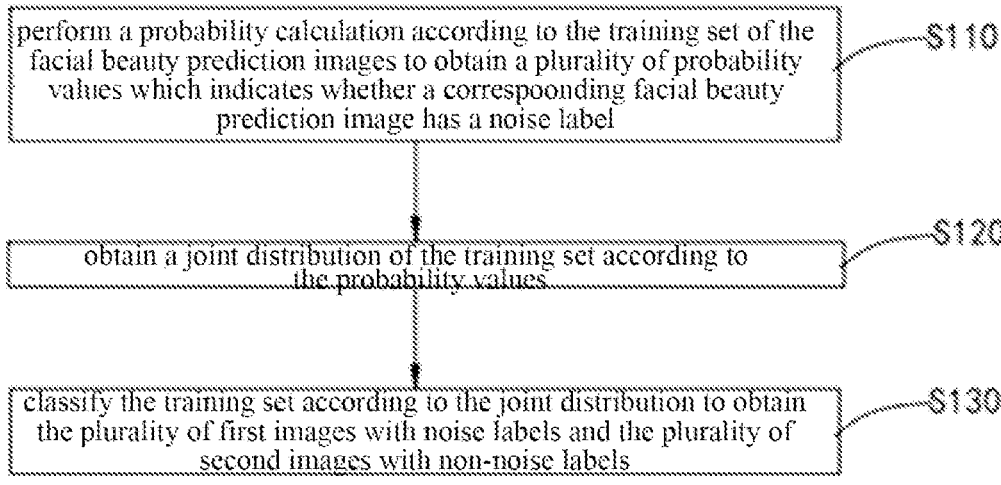

perform a probability calculation according to the training set of the facial beauty prediction images to obtain a plurality of probability values which indicates whether a correspoonding facial beauty prediction image has a noise label — S110 obtain a joint distribution of the training set according to the probability values — S120 classify the training set according to the joint distribution to obtain the plurality of first images with noise labels and the plurality of second images with non-noise labels — S130

FIG. 2

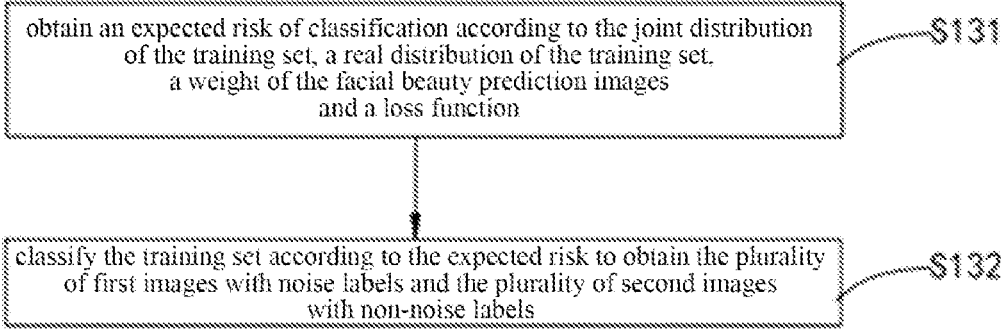

obtain an expected risk of classification according to the joint distribution of the training set, a real distribution of the training set, a weight of the facial beauty prediction images and a loss function — S131 classify the training set according to the expected risk to obtain the plurality of first images with noise labels and the plurality of second images with non-noise labels — S132

FIG. 3

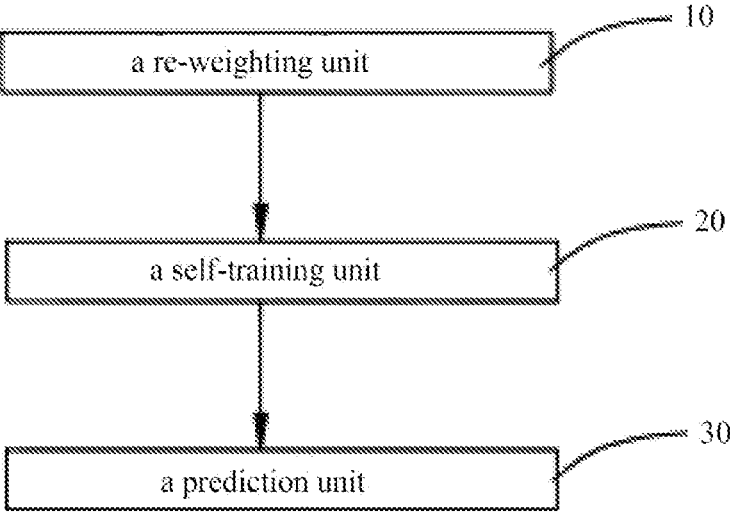

a re-weighting unit — 10 a self-training unit — 20 a prediction unit — 30

FIG. 4

FACIAL BEAUTY PREDICTION METHOD, APPARATUS, DEVICE AND STORAGE MEDIUM

CROSS-REFERENCE TO RELATED APPLICATION

This application is a national stage filing under 35 U.S.C. § 371 of international application number PCT/CN2023/095555, filed May 22, 2023, which claims priority to Chinese patent application No. 202310525485.5 filed May 10, 2023. The entire contents of these applications are incorporated herein by reference in their entirety.

FIELD OF THE INVENTION

Embodiments of the disclosure relate to, but are not limited to, the field of image recognition, in particular to a method and an apparatus for facial beauty prediction, a device and a storage medium.

BACKGROUND OF THE INVENTION

Relative facial beauty prediction methods usually require a large amount of labeled data for model training. Meanwhile, when a noise sample is labeled, a label quality is influenced by subjective factors of manual or machine data labeling, a tool technology and other factors, thereby introducing a label noise. A label noise problem can greatly influence an accuracy of a model, and a facial beauty prediction effect is reduced.

SUMMARY OF THE INVENTION

The following is a summary of the subject matter described in detail herein. The summary is not intended to limit the scope of protection of the claims.

The embodiments of the disclosure disclose method an apparatus for facial beauty prediction, device and storage medium, which can weaken dependence of a model on noise labels and enhance an utilization effect of unlabeled data.

According to an embodiment of a first aspect of the present disclosure, a facial beauty prediction method may include following steps.

A training set of facial beauty prediction images is classified to obtain a plurality of first images with noise labels and a plurality of second images with non-noise labels.

A re-weighting processing is performed on the plurality of the second images.

A target training set is formed by the plurality of the first images and the plurality of the re-weighted second images, and a first model is trained by using the target training set to obtain a second model.

A labeling processing is performed on image data by using the second model to obtain first data with labels and second data without labels.

The second data is trained through a classifier to generate third data with pseudo labels.

The classifier is trained according to the first data, the second data and the third data to obtain a target classifier.

A facial beauty prediction is performed on an image to be predicted through a facial beauty prediction model with the target classifier to obtain a facial beauty prediction result.

In some embodiments of the first aspect of the present disclosure, the classifying a training set of facial beauty prediction images to obtain a plurality of first images with noise labels and a plurality of second images with non-noise labels may include following sub-steps.

A probability calculation is performed according to the training set of the facial beauty prediction images to obtain a plurality of probability values each of which indicates whether a corresponding facial beauty prediction image has a noise label.

A joint distribution of the training set is obtained according to the plurality of probability values.

The training set is classified according to the joint distribution to obtain the plurality of first images with noise labels and the plurality of second images with non-noise labels.

In some embodiments of the first aspect of the present disclosure, the classifying the training set according to the joint distribution to obtain the plurality of first images with noise labels and the plurality of second images with non-noise labels may include following sub-steps.

An expected risk of classification is obtained according to the joint distribution of the training set, a real distribution of the training set, a weight of the facial beauty prediction image and a loss function.

The training set is classified according to the expected risk to obtain the plurality of first images with noise labels and the plurality of second images with non-noise labels.

In some embodiments of the first aspect of the present disclosure, the weight of the facial beauty prediction image is determined by the joint distribution of the training set and a noise rate.

In some embodiments of the first aspect of the present disclosure, the noise rate is a minimum value of the joint distribution of the training set within a preset range.

In some embodiments of the first aspect of the present disclosure, when a value of the joint distribution of the training set is not equal to 0, the weight is not negative; when the value of the joint distribution of the training set is equal to 0, the weight is equal to 0.

In some embodiments of the first aspect of the present disclosure, the training the classifier according to the first data, the second data and the third data to obtain a target classifier may include following sub-step.

The classifier is trained according to the first data, the second data and the third data until the classifier converges to the target classifier.

According to an embodiment of a second aspect of the present disclosure, an apparatus for facial beauty prediction may include following units.

A re-weighting unit is configured to classify a training set of facial beauty prediction images to obtain a plurality of first images with noise labels and a plurality of second images with non-noise labels, perform a re-weighting processing on the plurality of the second images, form a target training set by the plurality of the first images and the plurality of the re-weighted second images, and train a first model by using the target training set to obtain a second model.

A self-training unit is configured to perform labeling processing on image data by using the second model to obtain first data with labels and second data without labels, train the second data through a classifier to generate third data with pseudo labels, train the classifier according to the first data, the second data and the third data to obtain a target classifier.

A prediction unit is configured to perform facial beauty prediction on an image to be predicted through a facial beauty prediction model with the target classifier to obtain a facial beauty prediction result.

According to an embodiment of a third aspect of the disclosure, an electronic device may include: a memory, a processor and a computer program stored on the memory and executable on the processor. The computer program is executed by the processor to implement the facial beauty prediction method as described above.

According to an embodiment of a fourth aspect of the present disclosure, a computer-readable storage medium stores computer-executable instructions for performing the facial beauty prediction method as described above.

BRIEF DESCRIPTION OF THE DRAWINGS

Accompanying drawings are used to disclose a further understanding of the technical schemes of the present disclosure and constitute a part of the specification, in conjunction with embodiments of the present disclosure to explain the technical schemes thereof, and do not constitute a limitation on the technical schemes of the present disclosure.

FIG. 1 is a flowchart of a facial beauty prediction method according to an embodiment of the present disclosure;

FIG. 2 is a sub-flowchart of step S100;

FIG. 3 is a sub-flowchart of step S130;

FIG. 4 is a structure diagram of a facial beauty prediction apparatus according to an embodiment of the present disclosure.

DETAILED DESCRIPTION OF THE EMBODIMENTS

In order to make the purposes, technical schemes and advantages of the present disclosure clearer, the present disclosure is further described in detail below in conjunction with the accompanying drawings and embodiments. It should be understood that the specific embodiments described herein are intended only to interpret the disclosure, and shall not be constructed to limit the disclosure.

It is noted that while functional module divisions are disclosed in the diagram of the apparatus and logical sequences are shown in flowcharts, in some cases, module divisions of the apparatus may be different, and steps shown or described may be performed in sequences other than the sequences in the flowcharts. Terms such as "first", "second" and the like in the description, claims, or accompany drawings are used for distinguishing similar objects and not necessarily for describing a particular sequential or chronological order.

The embodiments of the present disclosure will be further explained with reference to the accompany drawings.

An embodiment of the disclosure discloses a method for facial beauty prediction.

Referring to FIG. 1, the facial beauty prediction method includes following steps.

In a step of S100, a training set of facial beauty prediction images is classified to obtain a plurality of first images with noise labels and a plurality of second images with non-noise labels.

In a step of S200, a re-weighting processing is performed on the plurality of the second images.

In a step of S300, a target training set is formed by the plurality of the first images and the plurality of the re-weighted second images, and a first model is trained by using the target training set to obtain a second model;

In a step of S400, a labeling processing is performed on image data by using the second model to obtain first data with labels and second data without labels;

In a step of S500, the second data is trained through a classifier to generate third data with pseudo labels;

In a step of S600, the classifier is trained according to the first data, the second data and the third data to obtain a target classifier.

In a step of S700, a facial beauty prediction is performed on an image to be predicted through a facial beauty prediction model with the target classifier to obtain a facial beauty prediction result.

Firstly, the training set is obtained. The training set includes a plurality of facial images are used as the facial beauty prediction images.

For example, a Large Scale Asian Facial Beauty Database (LSAFBD) may be used to obtain the training set of the facial beauty prediction images.

Referring to FIG. 2, in the step S100, the classifying a training set of facial beauty prediction images to obtain a plurality of first images with noise labels and a plurality of second images with non-noise labels, includes, but is not limited to, the following steps.

In a step of S110, a probability calculation is performed according to the training set of the facial beauty prediction images to obtain a plurality of probability values each of which indicates whether a corresponding facial beauty prediction image has a noise label.

In a step of S120, a joint distribution of the training set is obtained according to the plurality of probability values.

In a step of S130, the training set is classified according to the joint distribution to obtain the plurality of the first images with noise labels and the plurality of the second images with non-noise labels.

It should be understood that a joint distribution function is also called a multidimensional distribution function. Taking the two-dimensional case as an example, (X, Y) is a two-dimensional random variable, and x and y are any real numbers, then a binary function $F(X,Y)=P(\{X \leq x \cap Y \leq y\})=P(X \leq x, Y \leq y)$ is called a distribution function of the two-dimensional random variable (X, Y), or a joint distribution function of X and Y.

Referring to FIG. 3, in the step S130, the classifying the training set according to the joint distribution to obtain the plurality of first images with noise labels and the plurality of second images with non-noise labels, includes following steps.

In a step S131, an expected risk of classification is obtained according to the joint distribution of the training set, a real distribution of the training set, a weight of the facial beauty prediction image and a loss function.

In a step S132, the training set is classified according to the expected risk to obtain the plurality of first images with noise labels and the plurality of second images with non-noise labels.

For step S131, the expected risk of classification is obtained according to the joint distribution of the training set, the real distribution of the training set, the weight of the facial beauty prediction image and the loss function.

Further, a noise label data classification algorithm is disclosed. Firstly, the expected risk of classification should satisfy the following relational expression:

$$R_{l,D}(f) = R[D, f, l] = E_{(X,Y) \sim D}[l(f(X), Y)] = E_{(X,\hat{Y}) \sim D_\rho}\left[\frac{P_D(X, Y)}{P_{D_\rho}(X, \hat{Y})}\right]$$

-continued $$l(f(X), \hat{Y})] = R\left[D_\rho, f, \frac{P_D(X, Y)}{P_{D_\rho}(X, \hat{Y})} l(f(X), \hat{Y})\right] =$$

$$R\left[D_\rho, f, \beta(X, \hat{Y})l(f(X), \hat{Y})\right] = R_{\beta l, D_\rho}(f);$$

where, l denotes a loss function, $P_D(X,Y)$ denotes the real distribution of the training set, $P_{D_\rho}(X|\hat{Y})$ denotes the joint distribution of the training set, and $\beta(X|\hat{Y})$ denotes the weight of the facial beauty prediction image.

For example, the weight of the facial beauty prediction image is determined by the joint distribution of the training set and a noise rate, i.e.

$$\beta(X, \hat{Y}) = \frac{P_{D_\rho}(\hat{Y} \mid X)}{(1 - \rho_{-\hat{Y}})P_{D_\rho}(\hat{Y} \mid X)};$$

where, $\beta(X,\hat{Y})$ is the weight of the human facial beauty prediction image.

The noise rate is a minimum value of the joint distribution of the training set within a preset range. The noise rate can be expressed by the following equation:

$$\rho_{-\hat{Y}} = \min_{X \in \chi} P_{D_\rho}(\hat{Y} \mid X).$$

When a value of the joint distribution of the training set is not equal to 0, the weight is not negative; otherwise, when the value of the joint distribution of the training set is equal to 0, the weight is equal to 0.

In the step S200, the plurality of the second images with non-noise labels are subjected to the re-weighting processing.

Generally, the re-weighting processing may be configured to increase weights of the plurality of the second images with non-noise labels/the first images with noise labels, or decrease the weights of the plurality of the second images with non-noise labels/the first images with noise labels, or filter the plurality of the second images with non-noise labels/the first images with noise labels. The weight of labeled data is adjusted by the re-weighting processing.

The re-weighting means that training data with noise labels is weighted again, so that correct data can obtain more weight, thereby improving the accuracy and robustness of the model. Noise labels are typically generated by manual or automatic labeling, so it has negative influences for model performance. The labeled data needs to be detected and re-weighted to reduce the influence on the model. A specific strategy may be selected according to a data set and a model requirement, for example, a probability modeling based method such as deep learning is adopted, so that the influence of noise labels is effectively reduced, and the model precision is improved.

In addition, the plurality of the first images with noise labels are subjected to the filtering processing.

In the step S300, both the plurality of the first images and the plurality of the re-weighted second images form the target training set, and the first model is trained by using the target training set to obtain the second model.

The model can accurately find the plurality of the first images with noise labels and accurately estimate a joint distribution of the plurality of the first images with noise labels and the plurality of the second images with non-noise labels.

In the step S400, the image data is labeled by using the second model to obtain the first data with labels and the second data without labels.

In the step S500, the second data is trained through the classifier to generate the third data with pseudo labels, where, the classifier is obtained from training the first data with labels.

In the step S600, the training the classifier according to the first data, the second data and the third data to obtain a target classifier, includes but not limited to the following steps.

The classifier is trained according to the first data, the second data and the third data until the classifier converges to be the target classifier.

According to the above semi-supervised learning, the model is trained and optimized by the unlabeled data. The basic idea is that a basic model is trained by labeled data, then the model is configured to predict unlabeled data. A part of the unlabeled data with high confidence coefficient is selected as new labeled data, and the training process is repeated until the model converges or reaches preset times. Advantages of the algorithm are that the unlabeled data can be fully utilized, a generalization performance of the model is improved, and the algorithm is particularly suitable for application under a condition of less labeled data.

In the step S700, facial beauty prediction is performed on an image to be predicted through the facial beauty prediction model with the target classifier to obtain a facial beauty prediction result.

The method for facial beauty prediction can utilize noise label re-weighting learning to perform the re-weighting processing on the training set, thereby reducing dependence of the model on the noise labels, and improving a classification performance and a generalization capability of the model. In a model self-training process, samples with uncertain classification, as noise labels, are filtered out or subjected to a label re-weighting process, so that only samples with high confidence coefficient are reserved for model training. A utilization effect of unlabeled data is enhanced. Precision of the model is improved in a self-adaptive manner, and an overfitting problem is avoided.

In addition, when prediction is carried out by using the unlabeled data, a prediction result with high confidence coefficient is used as newly added labeled data and is added into the training data, thereby improving a utilization rate of the samples and the performance of the model. In an iteration process, labeled data are continuously added, and a data labeling quality is gradually improved, so that the model has strong robustness.

In addition, for factors such as label exceptions or noises in the data, the algorithm can automatically adjust the model to ensure the stability and the accuracy of the algorithm. Meanwhile, the algorithm is based on a simple and efficient algorithm framework, and has a relatively high running speed.

An embodiment of the disclosure discloses an apparatus for facial beauty prediction.

Referring to FIG. 4, the facial beauty prediction apparatus includes: a re-weighting unit 10, a self-training unit 20 and a prediction unit 30.

The re-weighting unit 10 is configured to classify a training set of facial beauty prediction images to obtain a plurality of first images with noise labels and a plurality of second images with non-noise labels, perform a re-weighting processing on the plurality of second images, form a target training set by the plurality of first images and the plurality of the re-weighted second images, and train a first model by using the target training set to obtain a second model.

The self-training unit 20 is configured to perform labeling processing on image data by using the second model to obtain first data with labels and second data without labels, use the second data to train through a classifier to generate third data with pseudo labels, and train the classifier according to the first data, the second data and the third data to obtain a target classifier.

The prediction unit 30 is configured to perform facial beauty prediction on an image to be predicted through a facial beauty prediction model with the target classifier to obtain a facial beauty prediction result.

It can be understood that the apparatus for facial beauty prediction in the embodiment adopts the facial beauty prediction method as described above. Each unit of the apparatus for facial beauty prediction in the embodiment corresponds to the steps of the method for facial beauty prediction described above, so that the same technical problems that the facial beauty prediction method solved as described above are solved, and the facial beauty prediction apparatus has the same beneficial effects as the facial beauty prediction method described above.

An embodiment of the present disclosure discloses an electronic device, including: a memory, a processor and a computer program stored on the memory and executable on the processor. The computer program is executed by the processor to implement the method for facial beauty prediction as described above.

The electronic device can be any intelligent terminal including a tablet computer, a vehicle-mounted computer and the like.

The above schemes at least have the following beneficial effects. Noise label re-weighting learning can be utilized to perform a re-weighting processing on a training set, so that dependence of a model on the noise label is weakened, and a classification performance and a generalization capability of the model are improved. In a model self-training process, samples with uncertain classification are taken as noise labels, and a filtering or a label re-weighting processing is carried out, so that only samples with high confidence coefficient are reserved for model training. A utilization effect of unlabeled data is enhanced. Precision of the model is improved in a self-adaptive manner, and an overfitting problem is avoided. In addition, when prediction is carried out by using the unlabeled data, a prediction result with high confidence coefficient is used as newly added labeled data and is added into the training data, so that a utilization rate of the samples is improved, and a performance of the model is improved. In an iteration process, labeled data are continuously added, and a data labeling quality is gradually improved, so that the model has strong robustness. In addition, for factors such as label exceptions or noises in the data, the algorithm can automatically adjust the model, and a stability and an accuracy of the algorithm are ensured. Meanwhile, the algorithm is based on a simple and efficient algorithm framework, and has a relatively high running speed.

Generally, for a hardware structure of the electronic device, the processor may be implemented in the form of universal CPU (Central Processing Unit), microprocessor, ASIC (Application Specific Integrated Circuit), or one or more integrated circuits, and is configured to execute relevant programs to implement the technical schemes disclosed in the embodiments of the present disclosure.

The memory may be implemented in the form of ROM (Read Only Memory), static storage device, dynamic storage device, or RAM (Random Access Memory). The memory can store an operating system and other application programs. When the technical schemes disclosed in the embodiments of the present disclosure are implemented by software or firmware, relevant program codes are stored in the memory and called by the processor to execute the method of the embodiments of the present disclosure.

An input or output interface is configured to realize information input and output.

A communication interface is used for realizing communication interaction between the device and other devices, and can realize communication in a wired mode (such as USB, network cable and the like) and also can realize communication in a wireless mode (such as mobile network, WiFi®, Bluetooth® and the like).

A bus transfers information between various components of the device, such as the processor, the memory, the input or output interface, and the communication interface. The processor, the memory, the input or output interface and the communication interface are communicatively connected to each other within the device via a bus.

An embodiment of the present disclosure discloses a computer-readable storage medium, which stores computer-executable instructions for performing the method for facial beauty prediction as described above.

It should be recognized that the steps of the method in the embodiments of the present disclosure may be implemented or carried out in computer hardware, a combination of hardware and software, or by computer instructions stored in a non-transitory computer-readable memory. The method may use standard programming techniques. Each program may be implemented in a high level procedural or object oriented programming language to communicate with a computer system. However, the program can be implemented in assembly or machine language, if desired. In any case, the language may be a compiled or interpreted language. Furthermore, the program can be run on a specific programmed integrated circuit for this purpose.

Further, operations of the processes described herein can be performed in any suitable order unless otherwise indicated herein or otherwise clearly contradicted by context. The processes (or variations and/or combinations thereof) described herein may be performed under the control of one or more computer systems configured with executable instructions and may be implemented as codes (e.g., executable instructions, one or more computer programs, or one or more applications) collectively executed on one or more processors, by hardware, or combinations thereof. The computer program includes a plurality of instructions executable by one or more processors.

Further, the methods may be implemented in any type of computing platform operatively connected to a suitable form, including but not limited to personal computer, smartphone, mainframe, workstation, networked or distributed computing environment, separate or integrated computer platform, or in communication with a charged particle tool or other imaging devices, or the like. Aspects of the disclosure may be implemented in machine-readable code stored on a non-transitory storage medium or device, whether removable or integrated onto a computing platform, such as a hard disk, an optically read and/or write storage medium, RAM, ROM, etc., so that it is readable by a programmable computer. When the storage medium or device is read by the computer, the computer is configured and operated to perform the procedures described herein. Further, the machine-readable code, or portions thereof, may be transmitted over a wired or wireless network. The disclosure described herein includes these and other different types of non-transitory computer-readable storage medium when such medium includes instructions or programs that implement the steps described above in conjunction with a microprocessor or other data processor. The disclosure also includes the computer itself when programmed according to the methods and techniques described herein.

A computer program can be applied to input data to perform the functions described herein to transform input data to generate output data that is stored to non-volatile memory. The output information may also be applied to one or more output devices, such as a display. In a preferred embodiment of the disclosure, the transformed data represents physical and tangible objects, including particular visual depictions of physical and tangible objects produced on a display.

While embodiments of the present disclosure have been shown and described, it will be understood by those of ordinary skill in the art that: various changes, modifications, substitutions and variations can be made to the embodiments without departing from the principles and spirit of the disclosure. The scope of the disclosure is defined by the claims and their equivalents.

The above is a detailed description of preferred embodiments of the disclosure, but the disclosure is not limited to the embodiments. Those having ordinary skill in the art can make various equivalent variations or substitutions without violating the disclosure, and these equivalent variations or substitutions are included in the scope defined by the embodiments.

What is claimed is:

1. A method for facial beauty prediction, comprising:
classifying a training set of facial beauty prediction images to obtain a plurality of first images with noise labels and a plurality of second images with non-noise labels;
performing a re-weighting processing on the second images;
forming a target training set by the plurality of the first images and the plurality of the re-weighted second images, and training a first model by using the target training set to obtain a second model;
performing a labeling processing on image data by using the second model to obtain first data with labels and second data without labels;
training the second data through a classifier to generate third data with pseudo labels;
training the classifier according to the first data, the second data and the third data to obtain a target classifier; and
performing facial beauty prediction on an image to be predicted through a facial beauty prediction model with the target classifier to obtain a facial beauty prediction result.

2. The method for facial beauty prediction according to claim 1, wherein, the classifying a training set of facial beauty prediction images to obtain a plurality of first images with noise labels and a plurality of second images with non-noise labels comprises:
performing a probability calculation according to the training set of the facial beauty prediction images to obtain a plurality of probability values each of which indicates whether a corresponding facial beauty prediction image has a noise label;
obtaining a joint distribution of the training set according to the plurality of probability values; and
classifying the training set according to the joint distribution to obtain the plurality of first images with noise labels and the plurality of second images with non-noise labels.

3. The method for facial beauty prediction according to claim 1, wherein, the classifying the training set according to the joint distribution to obtain the plurality of first images with noise labels and the plurality of second images with non-noise labels comprises:
obtaining an expected risk of classification according to the joint distribution of the training set, a real distribution of the training set, a weight of the facial beauty prediction image and a loss function; and
classifying the training set according to the expected risk to obtain the plurality of first images with noise labels and the plurality of second images with non-noise labels.

4. The method for facial beauty prediction according to claim 3, wherein, the weight of the facial beauty prediction image is determined by the joint distribution of the training set and a noise rate.

5. The method for facial beauty prediction according to claim 4, wherein, the noise rate is a minimum value of the joint distribution of the training set within a preset range.

6. The method for facial beauty prediction according to claim 4, wherein, the weight is not negative in response to a value of the joint distribution of the training set being not equal to 0, and the weight is equal to 0 in response to the value of the joint distribution of the training set being equal to 0.

7. The method for facial beauty prediction according to claim 1, wherein, the training the classifier according to the first data, the second data and the third data to obtain a target classifier comprises:
training the classifier according to the first data, the second data and the third data until the classifier converges to the target classifier.

8. An electronic device, comprising:
a memory, a processor and a computer program stored on the memory and executable on the processor, wherein, the computer program, when executed by the processor, causes the processor to perform a method for facial beauty prediction comprising:
classifying a training set of facial beauty prediction images to obtain a plurality of first images with noise labels and a plurality of second images with non-noise labels;
performing a re-weighting processing on the second images;
forming a target training set by the plurality of the first images and the plurality of the re-weighted second images, and training a first model by using the target training set to obtain a second model;
performing a labeling processing on image data by using the second model to obtain first data with labels and second data without labels;
training the second data through a classifier to generate third data with pseudo labels;
training the classifier according to the first data, the second data and the third data to obtain a target classifier; and performing facial beauty prediction on an image to be predicted through a facial beauty prediction model with the target classifier to obtain a facial beauty prediction result.

9. The electronic device according to claim 8, wherein, the classifying a training set of facial beauty prediction images to obtain a plurality of first images with noise labels and a plurality of second images with non-noise labels comprises:

performing a probability calculation according to the training set of the facial beauty prediction images to obtain a plurality of probability values each of which indicates whether a corresponding facial beauty prediction image has a noise label;

obtaining a joint distribution of the training set according to the plurality of probability values; and classifying the training set according to the joint distribution to obtain the plurality of first images with noise labels and the plurality of second images with non-noise labels.

10. The electronic device according to claim 8, wherein, the classifying the training set according to the joint distribution to obtain the plurality of first images with noise labels and the plurality of second images with non-noise labels comprises:

obtaining an expected risk of classification according to the joint distribution of the training set, a real distribution of the training set, a weight of the facial beauty prediction image and a loss function; and classifying the training set according to the expected risk to obtain the plurality of first images with noise labels and the plurality of second images with non-noise labels.

11. The electronic device according to claim 10, wherein, the weight of the facial beauty prediction image is determined by the joint distribution of the training set and a noise rate.

12. The electronic device according to claim 11, wherein, the noise rate is a minimum value of the joint distribution of the training set within a preset range.

13. The electronic device according to claim 11, wherein, the weight is not negative in response to a value of the joint distribution of the training set being not equal to 0, and the weight is equal to 0 in response to the value of the joint distribution of the training set being equal to 0.

14. The electronic device according to claim 8, wherein, the training the classifier according to the first data, the second data and the third data to obtain a target classifier comprises:

training the classifier according to the first data, the second data and the third data until the classifier converges to the target classifier.

15. A non-transitory computer-readable storage medium storing computer-executable instructions which, when executed by a processor, causes the processor to perform a method for facial beauty prediction comprising:

classifying a training set of facial beauty prediction images to obtain a plurality of first images with noise labels and a plurality of second images with non-noise labels;

performing a re-weighting processing on the second images;

forming a target training set by the plurality of the first images and the plurality of the re-weighted second images, and training a first model by using the target training set to obtain a second model;

performing a labeling processing on image data by using the second model to obtain first data with labels and second data without labels;

training the second data through a classifier to generate third data with pseudo labels;

training the classifier according to the first data, the second data and the third data to obtain a target classifier; and performing facial beauty prediction on an image to be predicted through a facial beauty prediction model with the target classifier to obtain a facial beauty prediction result.

16. The non-transitory computer-readable storage medium according to claim 15, wherein, the classifying a training set of facial beauty prediction images to obtain a plurality of first images with noise labels and a plurality of second images with non-noise labels comprises:

performing a probability calculation according to the training set of the facial beauty prediction images to obtain a plurality of probability values each of which indicates whether a corresponding facial beauty prediction image has a noise label;

obtaining a joint distribution of the training set according to the plurality of probability values; and classifying the training set according to the joint distribution to obtain the plurality of first images with noise labels and the plurality of second images with non-noise labels.

17. The non-transitory computer-readable storage medium according to claim 15, wherein, the classifying the training set according to the joint distribution to obtain plurality of first images with noise labels and the plurality of second images with non-noise labels comprises:

obtaining an expected risk of classification according to the joint distribution of the training set, a real distribution of the training set, a weight of the facial beauty prediction image and a loss function; and classifying the training set according to the expected risk to obtain the plurality of first images with noise labels and the plurality of second images with non-noise labels.

18. The non-transitory computer-readable storage medium according to claim 17, wherein, the weight of the facial beauty prediction image is determined by the joint distribution of the training set and a noise rate.

19. The non-transitory computer-readable storage medium e according to claim 18, wherein, the noise rate is a minimum value of the joint distribution of the training set within a preset range.

20. The non-transitory computer-readable storage medium according to claim 18, wherein, the weight is not negative in response to a value of the joint distribution of the training set being not equal to 0, and the weight is equal to 0 in response to the value of the joint distribution of the training set being equal to 0.

* * * * *